(12) United States Patent
Ko et al.

(10) Patent No.: US 7,733,761 B2
(45) Date of Patent: Jun. 8, 2010

(54) FERROELECTRIC RECORDING MEDIUM COMPRISING ANISOTROPIC CONDUCTION LAYER, RECORDING APPARATUS COMPRISING THE SAME, AND RECORDING METHOD OF THE SAME

(75) Inventors: Hyoung-soo Ko, Seoul (KR); Ju-hwan Jung, Seoul (KR); Seung-bum Hong, Seongnam-si (KR); Hong-sik Park, Seoul (KR); Chul-min Park, Yongin-si (KR); Kyoung-lock Baeck, Busan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 11/261,612

(22) Filed: Oct. 31, 2005

(65) Prior Publication Data
US 2006/0092817 A1    May 4, 2006

(30) Foreign Application Priority Data
Oct. 29, 2004    (KR)    .................... 10-2004-0087040

(51) Int. Cl.
*G11B 7/00*    (2006.01)
(52) U.S. Cl. .................. 369/126; 369/276; 365/145
(58) Field of Classification Search ............... 369/126, 369/135, 276; 438/3; 257/59, 295; 428/826, 428/828; 365/109, 117, 145
See application file for complete search history.

(56) References Cited

U.S. PATENT DOCUMENTS

| | | | |
|---|---|---|---|
| 3,148,354 A | | 9/1964 | Schaffert |
| 3,710,352 A | | 1/1973 | Smith et al. |
| 3,710,353 A | | 1/1973 | Jacobs et al. |
| 6,111,284 A | * | 8/2000 | Sakurai ..................... 257/310 |
| 6,284,654 B1 | * | 9/2001 | Roeder et al. ............... 438/681 |
| 2003/0047764 A1 | * | 3/2003 | Joo ............................ 257/295 |
| 2003/0119211 A1 | * | 6/2003 | Summerfelt et al. .......... 438/3 |
| 2003/0201475 A1 | * | 10/2003 | Uchiyama et al. .......... 257/295 |
| 2005/0163021 A1 | | 7/2005 | Kumasaka et al. |
| 2005/0285169 A1 | * | 12/2005 | Ahner et al. ................ 257/295 |

FOREIGN PATENT DOCUMENTS

| | | |
|---|---|---|
| EP | 0851417 A1 | 7/1998 |
| FR | 2786005 | 5/2000 |
| GB | 2407694 A | 5/2005 |
| JP | 59-215096 | 12/1984 |
| JP | 59-215097 | 12/1984 |
| JP | 9-198729 A | 7/1997 |

OTHER PUBLICATIONS

Jiang et al. "A new polymer thin film with electrical bistable states" Journal of Functional Materials and Devices, Sep. 2004, vol. 10, No. 3.

* cited by examiner

*Primary Examiner*—Wayne R Young
*Assistant Examiner*—Thomas D Alunkal
(74) *Attorney, Agent, or Firm*—Sughrue Mion, PLLC

(57) ABSTRACT

Provided is a ferroelectric recording medium including a ferroelectric recording layer formed of a polarization reversal ferroelectric material and an anisotropic conduction layer that covers the ferroelectric recording layer and changes into a conductor or a non-conductor based on external energy.

19 Claims, 3 Drawing Sheets

FERROELECTRIC RECORDING MEDIUM COMPRISING ANISOTROPIC CONDUCTION LAYER, RECORDING APPARATUS COMPRISING THE SAME, AND RECORDING METHOD OF THE SAME

CROSS-REFERENCE TO RELATED PATENT APPLICATIONS

This application claims priority from Korean Patent Application No. 10-2004-0087040, filed on Oct. 29, 2004, in the Korean Intellectual Property Office, the disclosure of which is incorporated herein in its entirety by reference.

BACKGROUND OF THE INVENTION

1. Field of the Invention

The present invention relates to a ferroelectric recording medium, a recording apparatus comprising the same, and a recording method of the same, and more particularly, to a ferroelectric recording medium comprising an anisotropic conduction layer and a recording method of the same.

2. Description of the Related Art

In general a ferroelectric material has spontaneous polarization, which is reversed by an electric field. A ferroelectric recording medium is a nonvolatile recording medium having a high capacity on which data is recorded, corrected, and stored by using such a property of ferroelectric materials.

Japanese Laid-open Patent No. 2002-175602 discloses an example of a conventional ferroelectric recording medium, which is illustrated in FIG. 1.

Referring to FIG. 1, a ferroelectric recording layer 2 and a reading/writing head tip 1 are in direct contact in a conventional ferroelectric recording medium, and thus both the ferroelectric recording layer 2 and the reading/writing head tip 1 may be damaged. More specifically, the ferroelectric recording layer 2 and the reading/writing head tip 1 are formed of hard materials, and thus the damage may be serious. In other words, scratches may be formed on the ferroelectric recording layer 2, resulting in the deterioration of the stability of data recorded on the ferroelectric recording layer 2. In addition, the reading/writing head tip 1 may be damaged, resulting in the deterioration of reading/writing performance.

In order to prevent such problems, a soft protective film 3 covers the ferroelectric recording layer 2, as shown in FIG. 2. The soft protective film 3 prevents direct contact between the ferroelectric recording layer 2 and the reading/writing head tip 1 during a reading/writing operation, and thus the damage of the ferroelectric recording layer 2 and the reading/writing head tip 1 are prevented.

However, the protective film 3 on the ferroelectric recording layer 2 has low permittivity, and thus a voltage applied by the head tip 1 to the protective film 3 is distributed through the protective film 3. As a result, a high voltage is required for a writing operation. More specifically, permittivity determines a ratio between an electric flux density and an electric field, and since the permittivity of the protective film 3 is very low, the protective film 3 has a high resistance. Accordingly, when a writing operation is performed on the ferroelectric recording layer 2, a large applied voltage is distributed to the protective film 3 according to the ratio of the resistance of the protective film 3 and the ferroelectric recording layer 2. Thus, a high voltage is required to perform a writing operation on the ferroelectric recording layer 2, considering a voltage distribution ratio of the protective film 3 and the ferroelectric recording layer 2.

SUMMARY OF THE INVENTION

The present invention provides a ferroelectric recording medium, a recording apparatus comprising the same, and a recording method of the same which allows a reading/writing operation to be performed by applying a low voltage from a reading/writing head tip to a ferroelectric recording layer by reducing a voltage distributed to a protective film which covers the ferroelectric recording layer.

According to an aspect of the present invention, there is provided a ferroelectric recording medium comprising: a ferroelectric recording layer formed of a polarization reversal ferroelectric material; and an anisotropic conduction layer that covers the ferroelectric recording layer and changes into a conductor or a non-conductor based on external energy.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
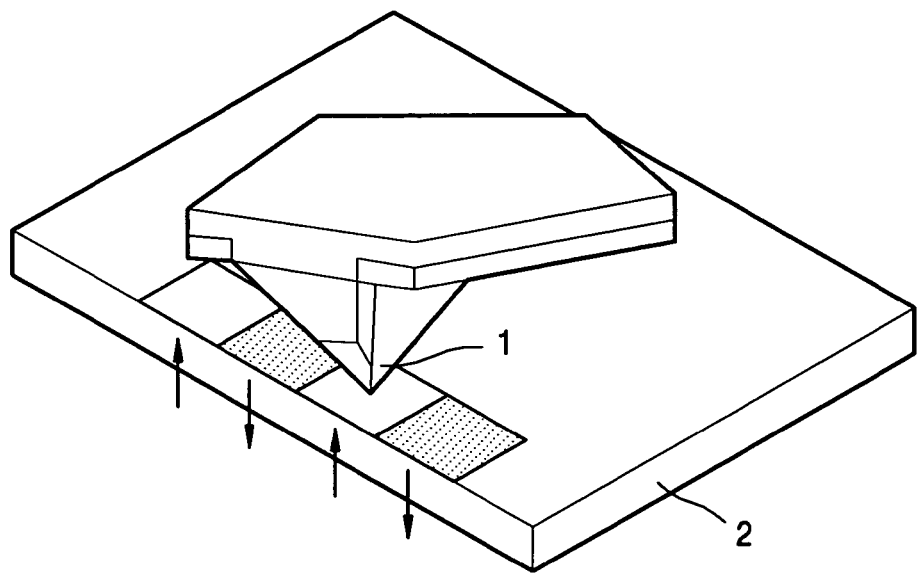
FIG. 1 is a perspective view of a conventional ferroelectric recording medium without a protective film.
Figure 2:
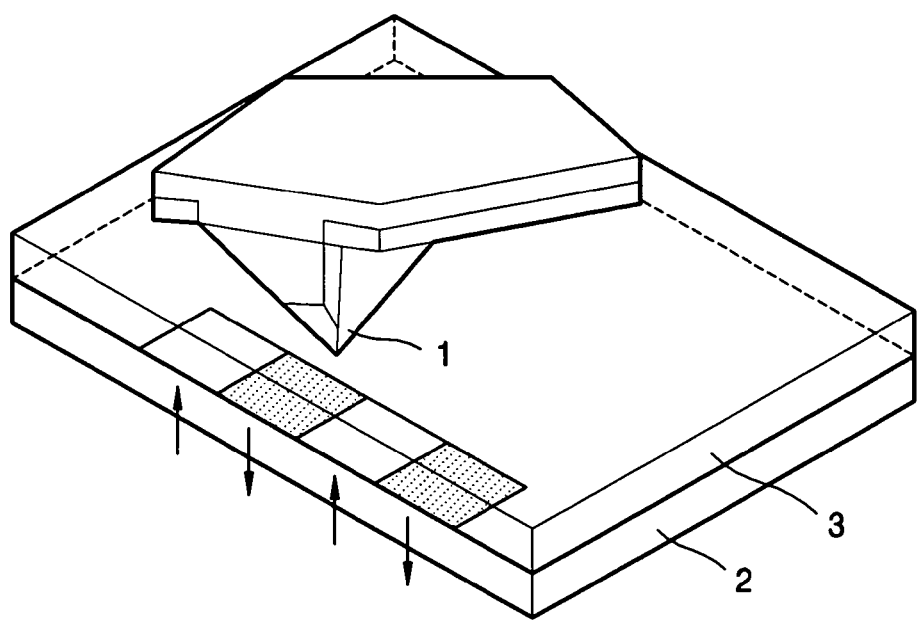
FIG. 2 is a perspective view of a conventional ferroelectric recording medium on which a protective film is formed.
Figure 3:
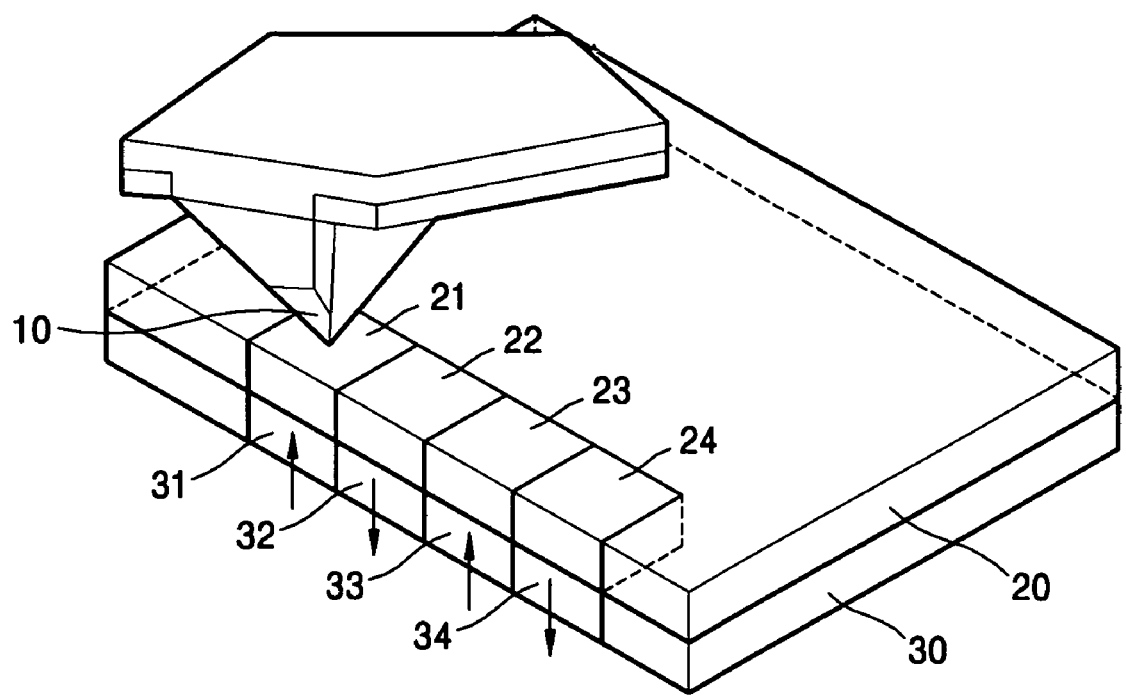
FIG. 3 is a perspective view of a ferroelectric recording medium according to an embodiment of the present invention.

FIG. 3 is a perspective view of a ferroelectric recording medium according to an embodiment of the present invention.

Referring to FIG. 3, the ferroelectric recording medium according to an embodiment of the present invention includes a transferable reading/writing head tip 10, a ferroelectric recording layer 30 on which a reading/writing operation is performed by the reading/writing head tip 10, and an anisotropic conduction layer 20 which covers the ferroelectric recording layer 30. The ferroelectric recording layer 30 includes sectors 31, 32, 33, and 34, and the anisotropic conduction layer 20 includes sectors 21, 22, 23, and 24 disposed on the sectors 31, 32, 33, and 34 of the ferroelectric recording layer 30, respectively.

The reading/writing head tip 10 moves above the ferroelectric recording layer 30 to perform a reading/writing operation at a predetermined location of the ferroelectric recording layer 30. The reading/writing heat tip 10 is formed of a hard material.

Data may be recorded in the ferroelectric recording layer 3 as 0 or 1, or ON or OFF, based on a direction of dielectric polarization. Each of the sectors 31, 32, 33, and 34 can individually store data recorded by the reading/writing heat tip 10.

The anisotropic conduction layer 20 covers the ferroelectric recording layer 30 such that the reading/writing head tip 10 does not directly contact the ferroelectric recording layer 30. Accordingly, the anisotropic conduction layer 20 prevents the generation of scratches on the ferroelectric recording layer 30 and damage to data and prevents damage to the reading/writing head tip 10 and the deterioration of reading/writing performance. The anisotropic conduction layer 20 may be formed of a soft material in order to improve the protection of the reading/writing head tip 10. Examples of a soft material are as follows: PFP (Para-Fluorophenylalanine), PMMA (Poly Methyl Meta Acrylate), PI (Polymide), Epoxy compound, etc. In addition, the anisotropic conduction layer 20 may be attached to the ferroelectric recording layer 30.

Since the anisotropic conduction layer 20 becomes conductive at a voltage greater than a critical voltage, thus operating as an electrode, the spontaneous polarization of the ferroelectric recording layer 30 may be reversed even when a voltage greater than a critical voltage is applied by the reading/writing head tip 10 to the ferroelectric recording layer 30. Accordingly, data may be recorded to the ferroelectric layer 30 by applying a low voltage. More specifically, when a voltage is applied by the reading/writing head tip 10, one of the sectors 21, 22, 23, and 24 of the anisotropic conduction layer 20 located under the reading/writing head tip 10 becomes a conductor. Then, the resistance of the anisotropic conduction layer 20 is reduced, and electric power supplied from the reading/writing head tip 10 to the ferroelectric recording layer 30 can smoothly flow. As a result, data can be efficiently recorded to the ferroelectric recording layer 30 through the anisotropic conduction layer 20, even when a low voltage (for example, a range of higher than 0 and no more than 10) is applied by the reading/writing head tip 10 to the ferroelectric recording layer 30. A method of changing the anisotropic conduction layer 20 into a conductor will now be described based on the volatility of the anisotropic conduction layer 20.

Figure 4:
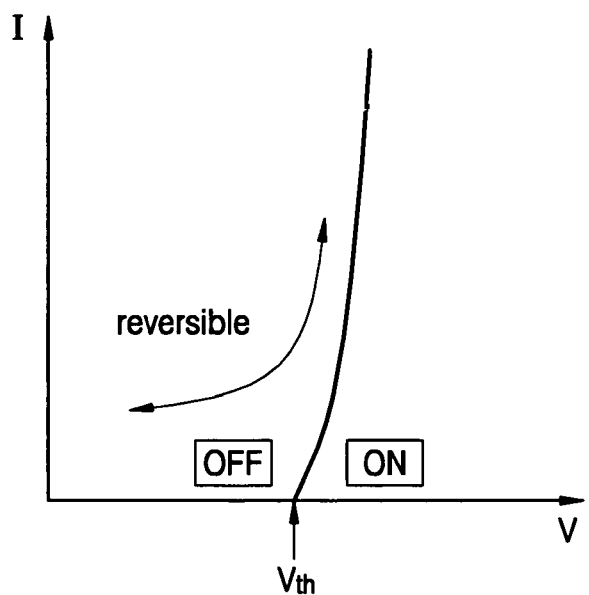
FIG. 4 is a graph illustrating the conductive transition of a volatile anisotropic conduction layer installed in a ferroelectric recording medium according to an embodiment of the present invention.

FIG. 4 is a graph illustrating the conductive transition of a volatile anisotropic conduction layer installed on a ferroelectric recording medium according to an embodiment of the present invention.

Referring to FIG. 4, the anisotropic conduction layer 20 disposed on the ferroelectric recording layer 30 is volatile and changes into a conductor or a nonconductor based on a voltage between the reading/writing head tip 10 and the ferroelectric recording layer 30.

The volatile anisotropic conduction layer 20 is nonconductive until the voltage between the reading/writing head tip 10 and the ferroelectric conduction layer 30 reaches a critical voltage Vth. Thereafter, the anisotropic conduction layer 20 becomes a conductor. The conductive state of the anisotropic conduction layer 20 is maintained until the applied voltage is lowered to the critical voltage Vth. When the applied voltage is lowered to the critical voltage Vth, the anisotropic conduction layer 20 is changed into a nonconductor.

Figure 5:
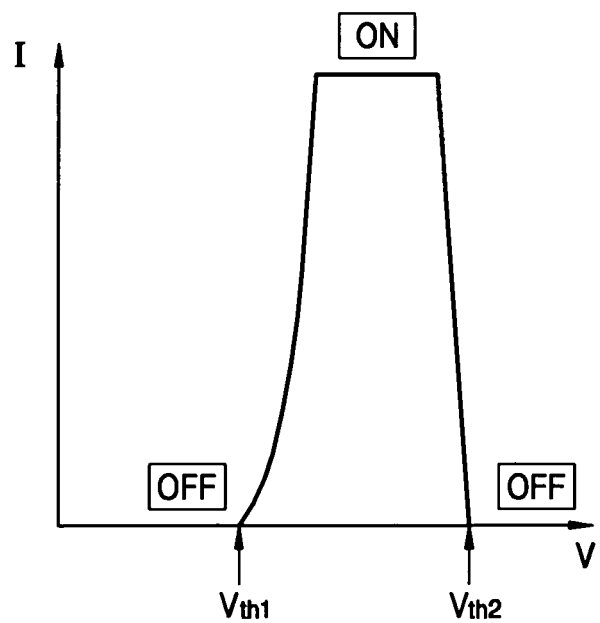
FIG. 5 is a graph illustrating the conductive transition of a nonvolatile anisotropic conduction layer installed in a ferroelectric recording medium according an embodiment of the present invention.

FIG. 5 is a graph illustrating the conductive transition of a nonvolatile anisotropic conduction layer installed on a ferroelectric recording medium according to the embodiment of the present invention.

Referring to FIG. 5, the anisotropic conduction layer 20 disposed on the ferroelectric recording layer 30 is nonvolatile and changes into a conductor or a nonconductor based on a voltage between the reading/writing head tip 10 and the ferroelectric recording layer 30.

The anisotropic conduction layer 20 is nonconductive until the voltage between the reading/writing head tip 10 and the ferroelectric conduction layer 30 reaches a critical voltage Vth1. Thereafter, the anisotropic conduction layer 20 becomes a conductor, and the conductive state is maintained even when the applied voltage is removed. When the applied voltage reaches another critical voltage Vth2, the anisotropic conduction layer 20 is changed into a nonconductor.

The operation of a ferroelectric recording medium according to an embodiment of the present invention will now be described.

First, the reading/writing head tip 10 of FIG. 3 is transferred to a location where a reading/writing operation is to be performed on the ferroelectric recording layer 30. Then, electric power is supplied to the reading/writing head tip 10 to apply a voltage to the anisotropic conduction layer 20. The anisotropic conduction layer 20 covering the ferroelectric recording layer 30 is initially in a nonconductive state.

When the voltage applied to the anisotropic conduction layer 20 is greater than the critical voltage Vth or Vth1 for changing the anisotropic conduction layer 20 into a conductor, one of the sectors 21, 22, 23, or 24 of the anisotropic conduction layer 20 located between the reading/writing head tip 10 and the ferroelectric recording layer 30 is changed into a conductor. Then, the electric resistance of the sector 21, 22, 23, or 24 of the anisotropic conduction layer 20 is lowered, allowing the smooth flow of electric power applied between the reading/writing head tip 10 and the ferroelectric recording layer 30. In this state, the reading/writing head tip 10 performs a reading/writing operation with the ferroelectric recording layer 30. Since the sector 21, 22, 23, or 24 of the anisotropic conduction layer 20 that covers a portion of the ferroelectric recording layer 30 where the reading/writing operation is to be performed is in a conductive state, a low voltage may be applied by the reading/writing head tip 10 to the ferroelectric recording layer 30 to perform the reading/writing operation.

After the reading/writing operation is completed, the reading/writing head tip 10 is moved from the location where the reading/writing operation has been performed and transferred to another location of the ferroelectric recording layer 30 in order to perform the reading/writing operation on the other location.

On the other hand, the sector 31, 32, 33, or 34 of the ferroelectric recording layer 30 that corresponds to the sector 21, 22, 23 or 24 is conductive, and becomes nonconductive under a predetermined condition. More specifically, if the anisotropic conduction layer 20 is volatile, it becomes nonconductive when the applied voltage is lower than the critical voltage Vth. On the other hand, if the anisotropic conduction layer 20 is nonvolatile, it remains conductive even when the applied voltage is removed and becomes nonconductive when the applied voltage is higher than the critical voltage Vth2. Since the transition of the anisotropic conduction layer 20 to a conductor is reversed when an electric field between the reading/writing head tip 10 and the ferroelectric recording layer 30 is removed or when a voltage greater than the critical voltage for changing the anisotropic conduction layer 20 into a conductor is applied, each of the sectors 21, 22, 23, and 24 is independent to the transition.

A ferroelectric recording medium, a recording apparatus comprising the same, and a recording method of the same according to embodiments of the present invention allow a reading/writing operation to be performed with a low voltage between a reading/writing head tip and a ferroelectric recording layer by changing into a conductor a sector of an anisotropic conduction layer disposed on a sector of the ferroelectric recording layer to which the reading/writing operation is to be performed.

In addition, according to the present invention, an anisotropic conduction layer covers a ferroelectric recording layer such that a reading/writing head tip does not directly contact the ferroelectric recording layer, and thus the generation of scratches on the ferroelectric recording layer and the damage to the reading/writing head tip are prevented. Thus, damage to data recorded on the ferroelectric recording layer is prevented to secure the stability of data and to maintain the reading/writing performance of the reading/writing head tip.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A ferroelectric recording medium comprising:
    a ferroelectric recording layer that includes sectors for storing data and is formed of a polarization reversal ferroelectric material; and
    an anisotropic conduction layer that includes sectors corresponding to the sectors of the ferroelectric recording layer, respectively, covers the ferroelectric recording layer, and changes into a conductor or a non-conductor based on external energy,
    wherein each of the sectors of the anisotropic conduction layer directly contacts each surrounding sector of the anisotropic conduction layer.

2. The ferroelectric recording medium of claim 1, wherein the energy is
    electric energy.

3. The ferroelectric recording medium of claim 1, wherein the anisotropic conduction layer is changed into a conductor when the external energy is greater than a predetermined level.

4. The ferroelectric recording medium of claim 1, wherein the anisotropic conduction layer is changed into a nonconductor when the external energy is removed.

5. The ferroelectric recording medium of claim 1, wherein the anisotropic conduction layer is attached to the ferroelectric recording layer.

6. A recording apparatus comprising:
    a head tip performing a reading/writing operation; and
    a ferroelectric recording medium comprising:
        a ferroelectric recording layer that includes sectors for storing data and is formed of a polarization reversal ferroelectric material, and
        an anisotropic conduction layer that includes sectors corresponding to the sectors of the ferroelectric recording layer, respectively, covers the ferroelectric recording layer, and changes into a conductor or a non-conductor based on external energy,
        wherein each of the sectors of the anisotropic conduction layer directly contacts each surrounding sector of the anisotropic conduction layer.

7. The recording apparatus of claim 6, wherein the head tip is a silicon tip.

8. The recording apparatus of claim 6, wherein the energy is electric energy.

9. The recording apparatus of claim 6, wherein the anisotropic conduction layer is changed into a conductor when the external energy is greater than a predetermined level.

10. The recording apparatus of claim 6, wherein the anisotropic conduction layer is changed into a nonconductor when the external energy is removed.

11. The recording apparatus of claim 6, wherein the anisotropic conduction layer is attached to the ferroelectric recording layer.

12. A recording method of a ferroelectric recording medium having a ferroelectric recording layer that includes sectors for storing data and an anisotropic conduction layer that includes sectors corresponding to the sectors of the ferroelectric recording layer, respectively, and covers the ferroelectric recording layer, the method comprising:
    applying external energy to the anisotropic conduction layer;
    changing the anisotropic conduction layer into a conductor using the external energy;
    transferring the external energy to the ferroelectric recording layer through the anisotropic conduction layer; and
    reversing the polarization of the ferroelectric recording layer using the external energy to perform a recording operation,
    wherein each of the sectors of the anisotropic conduction layer directly contacts each surrounding sector of the anisotropic conduction layer.

13. The method of claim 12, wherein the changing of the anisotropic conduction layer into a conductor comprises controlling the external energy to be greater than a first critical voltage required to change the anisotropic conduction layer into a conductor.

14. The method of claim 13, further comprising changing the anisotropic conduction layer into a nonconductor after the reversing of the polarization.

15. The method of claim 14, wherein the changing of the anisotropic conduction layer into a nonconductor comprises controlling the external energy to be less than first critical voltage required to change the anisotropic conduction layer into a conductor.

16. The method of claim 14, wherein the changing of the anisotropic conduction layer into a nonconductor comprises controlling the external energy to be greater than a second critical voltage required to change the anisotropic conduction layer into a nonconductor.

17. A ferroelectric recording medium comprising:
    a ferroelectric recording layer that includes sectors for storing data and is formed of a polarization reversal ferroelectric material; and
    an anisotropic conduction layer that includes sectors corresponding to the sectors of the ferroelectric recording layer, respectively, covers the ferroelectric recording layer, and changes into a conductor or a non-conductor based on external energy,
    wherein when the anisotropic layer is changed into a conductor, an electrical path is formed only between the anisotropic conduction layer and the ferroelectric recording layer below the anisotropic conduction layer in a direction perpendicular to the plane of the anisotropic conduction layer, and the anisotropic conduction layer remains an insulator in the plane parallel to the anisotropic conduction layer.

18. A recording apparatus comprising:
    a head tip performing a reading/writing operation; and
    a ferroelectric recording medium comprising:
        a ferroelectric recording layer that includes sectors for storing data and is formed of a polarization reversal ferroelectric material, and
        an anisotropic conduction layer that includes sectors corresponding to the sectors of the ferroelectric recording layer, respectively, covers the ferroelectric recording layer, and changes into a conductor or a non-conductor based on external energy, wherein when the anisotropic layer is changed into a conductor, an electrical path is formed only between the anisotropic conduction layer and the ferroelectric recording layer below the anisotropic conduction layer in a direction perpendicular to the plane of the anisotropic conduction layer, and the anisotropic conduction layer remains an insulator in the plane parallel to the anisotropic conduction layer.

19. A recording method for a ferroelectric recording medium having a ferroelectric recording layer that includes sectors for storing data and an anisotropic conduction layer that includes sectors corresponding to the sectors of the ferroelectric recording layer, respectively, and covers the ferroelectric recording layer, the method comprising:

applying external energy to the anisotropic conduction layer;

changing the anisotropic conduction layer into a conductor using the external energy;

transferring the external energy to the ferroelectric recording layer through the anisotropic conduction layer; and reversing the polarization of the ferroelectric recording layer using the external energy to perform a recording operation, wherein when the anisotropic layer is changed into a conductor, an electrical path is formed only between the anisotropic conduction layer and the ferroelectric recording layer below the anisotropic conduction layer in a direction perpendicular to the plane of the anisotropic conduction layer, and the anisotropic conduction layer remains an insulator in the plane parallel to the anisotropic conduction layer.

* * * * *